Oct. 14, 1947.　　A. H. JOHNSON　　2,428,878
CAP MOLDER FOR BOTTLES AND JARS
Filed Aug. 7, 1943　　2 Sheets-Sheet 1
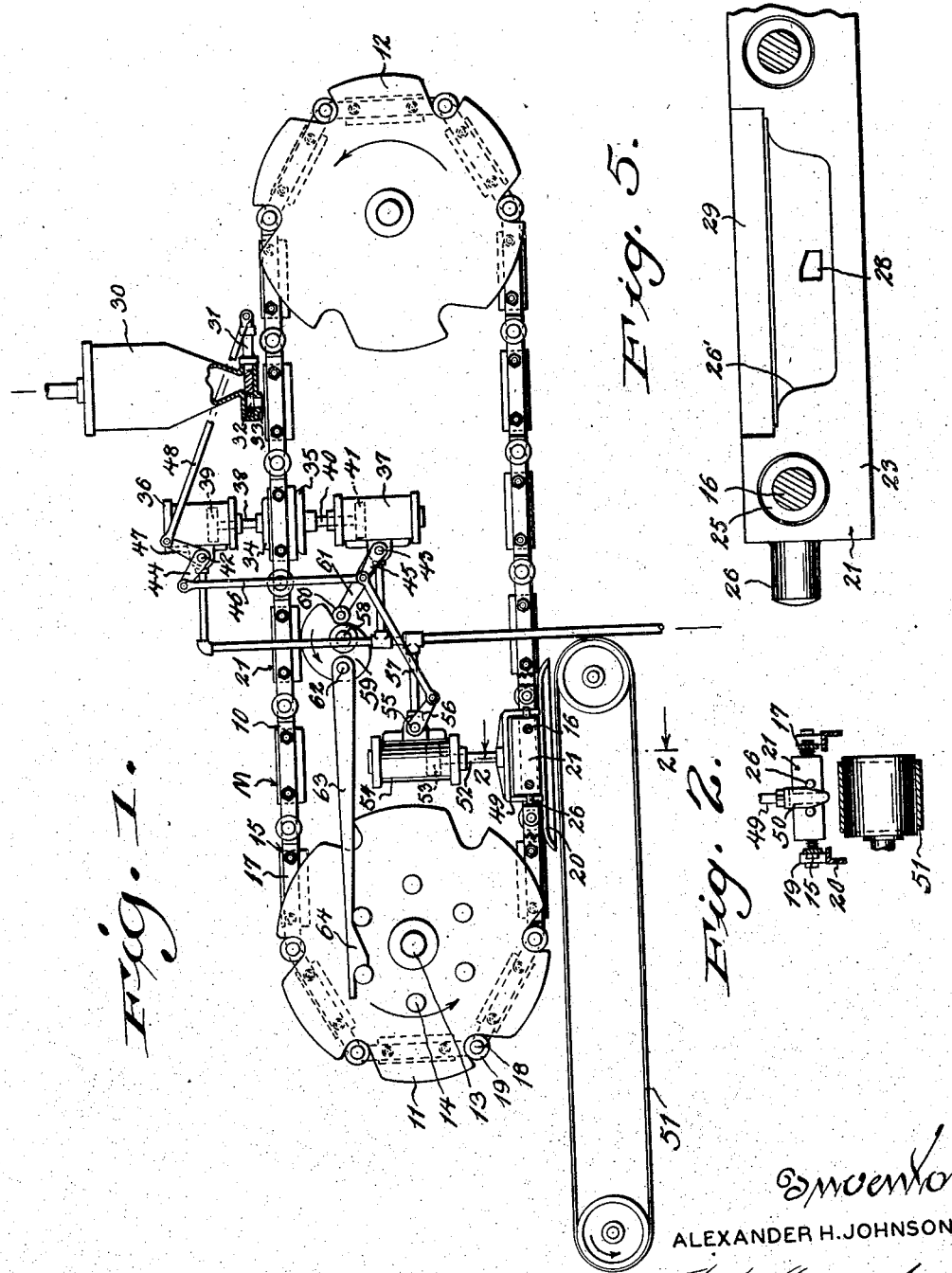

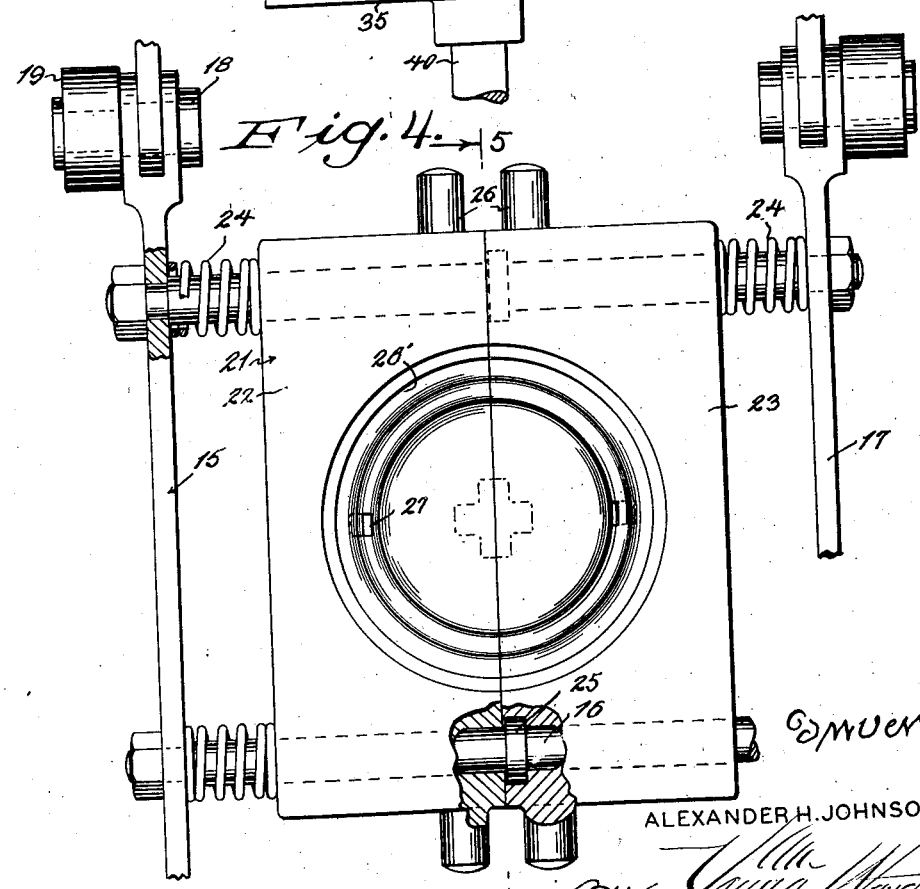

Patented Oct. 14, 1947

2,428,878

UNITED STATES PATENT OFFICE 2,428,878

CAP MOLDER FOR BOTTLES AND JARS

Alexander H. Johnson, Chicago, Ill., assignor of one-half to Frederick T. Johnson, Milwaukee, Wis.

Application August 7, 1943, Serial No. 497,742

4 Claims. (Cl. 18—4)

1

The invention appertains to bottles and jars and sealing closures therefor and more particularly to a novel means for rapidly and accurately molding stoppers or closures for bottles and jars.

In my application, Serial No. 482,079, now Patent No. 2,370,732, filed April 7, 1943, I have illustrated a bottle or jar and a sealing closure or stopper therefor. An application was filed June 15, 1943, Serial No. 490,842, now Patent No. 2,414,306, by me for molding the bottles and jars. The present application, as stated above, relates to a machine for the manufacture of the stoppers or closures.

One of the primary objects of my present invention is to provide an automatic machine in which bottle or jar stoppers of a predetermined form can be expeditiously molded at a rapid rate with the use of a minimum amount of time and labor.

Another salient object of my invention is the provision of a bottle or jar stopper or closure molding machine embodying an endless conveyor having transverse flights on which are mounted sectional base molds for the caps, stoppers or closures with means for advancing the conveyor step by step whereby certain operations can be performed.

Another important object of my invention is the provision of means for automatically delivering a predetermined charge of glass or plastic material to the sectional base mold members during the step by step travel of the conveyor.

A further object of my invention is the provision of means for cooperation with the sectional base molds for placing the material into said molds after the charging of the base molds and for giving the material in the base molds a predetermined top configuration.

A still further object of my invention is the provision of means for automatically opening the sectional base molds during the step by step movement of the conveyor, whereby the formed closures, stoppers or the like can be automatically discharged.

A still further important object of my invention is the provision of means for operating the top mold conveyor, the mold charging means, the top mold pressing means, and the base mold opening means all in proper timed relation to one another, whereby all of the steps will be performed in proper sequence.

With these and other objects in view, the invention consists in the novel construction, arrangement and formation of parts, as will be hereinafter more specifically described, claimed, and illustrated in the accompanying drawings, in which drawings:

Figure 1 is a side, elevational view of a diagrammatic nature illustrating one form of my novel plastic or glass closure cap molding machine, parts of the view being shown broken away and in section.

Figure 2 is a transverse, sectional view taken on the line 2—2 of Figure 1 looking in the direction of the arrows illustrating the means employed for opening the sectional base molds to permit the discharge of the formed closure caps.

Figure 3 is an enlarged fragmentary, detail, side, elevational view illustrating one of the sectional base molds and showing the novel means employed for forcing the material into the sectional base mold and for giving the upper surface of the material the desired configuration.

Figure 4 is an enlarged, fragmentary, top, plan view of a portion of the endless conveyor showing one of the bottom or base sectional molds.

Figure 5 is a detail, sectional view taken on the line 5—5 of Figure 4 looking in the direction of the arrows.

Referring to the drawing in detail, wherein similar reference characters designate corresponding parts throughout the several views, the letter M generally indicates my novel machine and the same includes an endless conveyor 10. This conveyor is mounted upon end supporting wheels 11 and 12. These wheels are mounted for rotary movement upon suitable axial shafts 13 mounted on any preferred type of frame (not shown). The wheels 11 and 12 can be in the nature of sprocket or similar wheels so that upon rotation thereof, the conveyor will be properly advanced. The wheel 11 is provided with equi-distantly spaced laterally extending pins 14 for a purpose, which will be later set forth.

The conveyor 10 includes a plurality of flights 15 and each of these flights includes pairs of guide rods 16. The ends of these guide rods are firmly connected to side links 17. The terminals of the links 17 of one flight are pivotally connected to the links 17 of an adjacent flight by means of pivot bolts or the like 18. Anti-friction rollers 19 can be mounted upon the pivot bolts for engagement with guide tracks 20 forming a part of the frame of the machine M.

Carried by the pair of guide rods 16 of each flight are sectional base molds 21 for the forming of the closure caps. The guide rods can carry any preferred number of the sectional base molds 21, but for the sake of simplicity, only one base mold 21 has been shown on the guide rods of each flight.

Each sectional base mold 21 includes like companion half sections 22 and 23 and these sections are slidably mounted adjacent to their opposite ends upon the guide rods 16. Expansion coil springs 24 are placed on the guide rods between the links 17 and the mold sections for normally urging the sections toward one another. The rods can be provided with stops 25 so that the mold sections will be properly centered on the rods. This is important as the molds have to be properly centered relative to other working parts of the machine which will be later described. The opposite ends of the mold sections 22 and 23 carry laterally extending pins 26 and means is provided for riding between the pins so as to move the mold sections apart and away from one another against tension of the springs 24 after the molding of the closure caps so that the caps or stoppers can be dropped from the base molds. By referring to Figures 3, 4, and 5, it will be seen that the sectional base molds 21 have formed in their upper faces cavities 26' which are shaped to conform to the configuration of the closure caps or stoppers being molded. The walls of the cavities are provided with cam shaped indentations 27, so that the cam shaped lugs 28 will be formed on the closure caps 29 at the time of the molding thereof. By referring more particularly to Figure 4, it can be seen that each section of the mold is provided with a cam shaped indentation, hence when the mold sections move apart the formed lugs on the closure caps will be disengaged from the mold sections. In the drawings only two cam shaped lugs 28 are shown, but obviously the cap can be provided with four lugs and in this instance, the mold cavity is provided with additional indentations 27 at the point where the mold sections separate.

As heretofore stated, it is one of the primary objects of my invention to advance the conveyor 10 in a step by step movement and to have a pause or rest between each step of the advancement of the conveyor. During the pause or rest, certain steps in the molding of the caps take place. These will now be described.

Arranged adjacent to the front end of the machine M above the top run of the conveyor is a hopper 30 for the molten glass or plastic material. The hopper can be filled in any preferred way and means can be provided for keeping the material in a plastic state. The lower end of the hopper is closed by a slide valve 31 having a measuring opening 32 therein. In one position of the slide valve, the measuring opening registers with the outlet of the hopper and becomes filled with the material. In another position of the slide valve, the measuring opening aligns with a dispensing spout 33 so that the measured quantity of plastic material or glass will be delivered to a sectional base mold and the parts are so timed that a mold will be at rest directly below the dispensing spout to receive the measured charge.

After a mold has become charged with the material, the same is acted upon by a plunger 34 and when the plunger moves downward, the conveyor will also be at rest. This plunger 34 functions to force the material uniformly into the base mold cavity and the plunger can be shaped to give the top of the closure any desired configuration, such as the configuration shown in Figure 3 of my pending application, Serial No. 482,079. While the plunger 34 is acting on a base mold, the base mold can be effectively supported by a table 35 and this table 35 moves upwardly as the plunger moves downwardly. Hence, the mold is subjected to pressure both from the top and bottom.

The table 35 and the plunger 34 can be operated in any preferred manner but I prefer to provide pressure cylinders and pistons for this purpose. Hence, I have illustrated a cylinder 36 for the plunger 34 and a cylinder 37 for the table 35. The plunger 34 has connected thereto a piston rod 38 which is connected to a piston 39 in the cylinder 36. The table 35 has connected thereto a piston rod 40 which is connected to a piston 41 in the cylinder 37. Compressed air or the like can be utilized by operating the pistons back and forth in their cylinders and the cylinder 39 is provided with a valve 42 and the cylinder 37 is provided with a valve 43. The cylinders and valves are of any preferred construction or make and hence these devices have not been shown in detail, but it is to be noted that the valve 42 is provided with an operating crank 44 and that the valve 43 is provided with an operating crank 45. These cranks are operatively connected together by means of a connecting rod 46 whereby the valves will be actuated synchronously.

While the conveyor is at rest, the valve 31 is in its open position for discharging the material into a sectional base mold, as heretofore stated, and the slide valve is operated with the valve 42. As indicated, a crank 47 is connected with the valve 42 and is located at an angle to the crank 44 and this crank 47 is operatively connected to the slide valve by means of a link 48.

During the stationary period of the conveyor, one of the sectional base molds 21 on the lower run of the conveyor is automatically opened so that a completed closure cap will be discharged from the mold. The mold is opened by means of a yoke 49 disposed above the lower run of the conveyor and the lower ends of the arms of the yoke are provided with tapered or cone shaped heads 50. When the yoke is depressed, the heads will ride between the pins 26 carried by the mold sections and the heads will spread the mold sections apart allowing the dropping of the completed caps. The completed cap can be received in a suitable container, and as illustrated, I have provided a conveyor belt 51 for receiving the caps or stoppers.

The yoke 49 is automatically raised and lowered by means of a conventional air operated motor and hence the yoke is connected by means of a piston rod 52 to the piston 53 mounted in the cylinder 54. A valve 55 is provided for controlling the flow of air or other operating medium to and from the opposite ends of the cylinder. This valve is actuated from a crank 56 and the crank is operatively connected to the crank 45 of the valve 43 by means of a connecting rod 57.

From the description so far, it can be seen that the valves 43, 44 and 55 as well as the slide valve 31 are all operated together and in proper timed relation.

In order to operate these valves and to advance the conveyor 10 in its step by step movement, a drive shaft 58 is provided. This drive shaft has secured thereto an operating cam 59. This cam is engaged by an anti-friction roller 60 carried by the main operating crank 61 which is connected with the valve 43. The main operating crank 61 can be urged toward the periphery of the cam 59 by means of a spring. An eccentric drive pin 62 is also carried by the cam and operatively mounted on the eccentric pin is a push lever 63 having a tooth 64 formed thereon adjacent to its outer end. The tooth 64 is adapted to successively engage the pins 14 on the belt supporting sprocket wheel 11.

Hence during the rotation of the shaft 58 the push lever 63 will be reciprocated back and forth and its tooth 64 will successively engage the pins 14. During the forward stroke of the push rod, the sprocket wheel carrying the pins will be turned a part of a revolution to advance the conveyor one flight so that each time the conveyor belt is advanced a new sectional base mold 21 will be brought under the slide valve, under the plunger and under the yoke 49. On the back stroke of the pusher rod 63, the conveyor will remain stationary and the various operations previously described will take place. As the pusher rod reaches the limit of its back stroke, its tooth 64 will engage another pin 14 so that on the forward stroke of said pusher rod the belt will again be advanced.

It can be seen that as soon as the roller 60 of the crank 61 rides off of the high point of the cam 59, the valves 40, 43, 55 and 31 will be operated and this takes place at the time the push rod 63 has just reached the limit of its forward stroke. As the cam continues to turn, the main crank 61 will be gradually moved back to its initial position for reversing the position of the valves so that the slide valve 31 will be brought back to its first position for receiving a new charge of the plastic material and so that the yoke 49 will be raised and the mold plunger 34 and the presser table 35 will be moved away from each other and the mold. When the push rod 63 moves forwardly to advance the conveyor the main crank 61 is held against operation by riding on the circular part of the cam 59. When the main crank 61 rides off of the high point of the cam, then the various valves are again operated.

From the foregoing description, it can be seen that a measured quantity of plastic material is delivered to each sectional base mold 21 and as a charged mold comes to rest under the mold plunger 34 and the presser table 35 the mold material is acted upon. The complete closure cap or stopper is discharged by the yoke 49 as described.

It may be desirable to utilize a sealing ring with the closure caps or stoppers and an annular seat 65 can be molded in each closure cap by the use of a mold ring 66. These mold rings 66 can be merely laid in the sectional base molds 21 before these molds reach the hopper for the plastic material.

Changes in details may be made without departing from the spirit or the scope of my invention, but what I claim as new is:

1. In a machine for molding plastic or glass articles, an endless conveyor having an upper and a lower run, sectional base molds mounted upon said conveyor spaced equal distances one from the other, a hopper for plastic material arranged above the upper run, a reciprocating plunger movable toward and away from the base molds, means for releasably supporting the base molds during downward movement of the plunger, means for spreading the sections of the base molds in the lower run of the conveyor for releasing molded articles from the base molds, a main drive shaft, and means operated directly from said drive shaft for intermittently operating the conveyor, the plunger, the support for the molds and the means for spreading the mold sections in proper timed relation.

2. In a machine for molding plastic or glass articles, an endless conveyor having an upper and a lower run, wheels for supporting the conveyor, one of said wheels having laterally extending pins, a hopper for plastic material arranged above the upper run, a plurality of equidistantly spaced sectional base molds mounted on the conveyor, a reciprocating plunger arranged above the upper run for movement toward and away from the base molds, means for supporting the base molds during downward movement of the plunger, means for spreading the sections of the base molds at the lower run of the conveyor, a control valve for the hopper for delivering a measured quantity of material to the base molds, a main drive shaft, a cam on said drive shaft having an eccentric pin, a push rod on said eccentric pin having a tooth being adapted to successively engage the pins on the conveyor wheel, and means for simultaneously operating the control valve, the plunger, the support, and the mold spreading means from said cam.

3. In a machine for molding plastic and glass articles, an endless conveyor including parallel links, transverse guide rods connecting said links, base molds mounted upon said conveyor between the links, each of said base molds including companion half sections having alined guide openings therethrough for receiving said guide rods, whereby said half mold sections can slide on said rods; spring means normally urging the sections toward one another, laterally extending spaced pins carried by the ends of said sections, a reciprocating operating rod movable toward and away from said pins, and a tapered head carried by said operating rod movable between the pins for moving said sections on said guide rods away from one another against the tension of the springs.

4. In a machine for molding plastic and glass articles, an endless conveyor including parallel links, transverse guide rods connecting said links, base molds mounted upon said conveyor between the links, each of said base molds including companion half sections having alined guide openings therethrough for receiving said guide rods, whereby said half mold sections can slide on said rods; spring means normally urging the sections toward one another, laterally extending spaced pins carried by the ends of said sections, a reciprocating operating rod movable toward and away from said pins, and a tapered head carried by said operating rod movable between the pins for moving said sections on said guide rods away from one another against the tension of the springs, and cooperative means between said rods and half mold sections for centering the mold sections on the guide rods relative to the longitudinal axis of the conveyor.

ALEXANDER H. JOHNSON.

REFERENCES CITED

The following references are of record in the file of this patent:

UNITED STATES PATENTS

| Number | Name | Date |
|---|---|---|
| 2,014,468 | Clayton | Sept. 17, 1935 |
| 2,193,395 | Dewey, Jr. | Mar. 12, 1940 |
| 867,210 | Reynolds et al. | Sept. 24, 1907 |
| 2,235,129 | Vining et al. | Mar. 18, 1941 |
| 2,253,276 | Jeffers | Aug. 19, 1941 |
| 2,032,812 | Quattrin et al. | Mar. 3, 1936 |
| 1,615,799 | Denaro | Jan. 25, 1927 |
| 740,346 | Williams | Sept. 29, 1903 |
| 1,475,532 | Barnhart et al. | Nov. 27, 1923 |